United States Patent
Masterson

(10) Patent No.: US 7,059,718 B2
(45) Date of Patent: Jun. 13, 2006

(54) EYEWEAR HAVING A MAGNIFIED WIDE FIELD OF VIEW

(75) Inventor: Byron J. Masterson, Sarasota, FL (US)

(73) Assignee: Hidden Harbor Group L.L.C., Sarasota, FL (US)

( * ) Notice: Subject to any disclaimer, the term of this patent is extended or adjusted under 35 U.S.C. 154(b) by 0 days.

(21) Appl. No.: 10/761,669

(22) Filed: Jan. 21, 2004

(65) Prior Publication Data

US 2005/0157255 A1    Jul. 21, 2005

(51) Int. Cl.
*G02C 7/02*    (2006.01)

(52) U.S. Cl. .................................. 351/159; 351/163

(58) Field of Classification Search ............. 351/159, 351/41, 44, 163, 164, 165, 177
See application file for complete search history.

(56) References Cited

U.S. PATENT DOCUMENTS

| | | | | |
|---|---|---|---|---|
| 1,401,327 | A | 12/1921 | Erhard | 351/84 |
| 4,778,266 | A | 10/1988 | Maitenaz | 351/169 |
| 4,830,482 | A | 5/1989 | Resnikoff | 351/172 |
| 5,614,964 | A * | 3/1997 | Garneau | 351/83 |
| 5,648,832 | A | 7/1997 | Houston et al. | 351/159 |
| 5,689,323 | A | 11/1997 | Houston et al. | 351/41 |
| 5,790,226 | A | 8/1998 | Pollak | 351/54 |
| 5,953,099 | A | 9/1999 | Walach | 351/168 |
| 6,126,285 | A * | 10/2000 | Oyama et al. | 351/160 R |
| 6,129,435 | A | 10/2000 | Reichow et al. | 351/41 |
| 6,142,624 | A | 11/2000 | Morris et al. | 351/159 |
| 6,149,271 | A * | 11/2000 | Menezes et al. | 351/169 |
| 6,176,577 | B1 * | 1/2001 | Monnoyeur et al. | 351/159 |
| 6,231,182 | B1 | 5/2001 | Guilino et al. | 351/159 |
| 6,309,067 | B1 | 10/2001 | Zeidler | 351/159 |
| 6,343,860 | B1 | 2/2002 | Pierotti | 351/159 |
| 6,361,166 | B1 | 3/2002 | Perrott et al. | 351/159 |
| 6,454,408 | B1 | 9/2002 | Morris et al. | 351/159 |
| 6,478,422 | B1 | 11/2002 | Hansen | 351/172 |
| 6,488,374 | B1 | 12/2002 | Alberts | 351/159 |
| 6,796,653 | B1 * | 9/2004 | Shirayanagi | 351/159 |

FOREIGN PATENT DOCUMENTS

JP    357157212 A    9/1992

\* cited by examiner

*Primary Examiner*—Jordan M Schwartz
*Assistant Examiner*—Jessica Stultz
(74) *Attorney, Agent, or Firm*—Blackwell Sanders Peper Martin LLP

(57) ABSTRACT

The present invention generally encompasses eyewear having a clear, magnified, wide field of view. The eyewear comprises dual lens elements that have steeply curved front surfaces and that are specifically oriented about the head of the wearer. The lens elements have a length and surface curvature that allow the lenses to be positioned so that they extend comfortably around the cheekbone of the wearer. Additionally, the orientation of the lens elements causes the optical axes of the lens elements to deviate away from the wearer's forward line of sight in a direction generally toward the wearer's temples so that the axes converge at a point behind the lens elements. The lens elements are spaced apart so that their optical nodes are positioned slightly wider than the distance between a wearer's pupils. Finally, the lens elements have significant positive magnification caused in part by the surface curvatures.

14 Claims, 2 Drawing Sheets

EYEWEAR HAVING A MAGNIFIED WIDE FIELD OF VIEW

CROSS-REFERENCE TO RELATED APPLICATIONS

Not applicable.

STATEMENT REGARDING FEDERALLY SPONSORED RESEARCH OR DEVELOPMENT

Not applicable.

BACKGROUND OF THE INVENTION

The present invention relates to eyewear. More specifically, the present invention encompasses eyewear that includes dual lens elements that provide a clear, magnified, wide field of view.

There are certain activities in which it would be beneficial to have eyewear that provided a clear, magnified, wide field of view. For example, a typical man involved in the activity of shaving his face utilizes practically his entire field of view. In particular, when a man shaves the side of his face, and especially the area of his sideburns and/or by his ear, he will usually rotate his head in one direction and his eyes in the opposite direction so that he can see the area he is shaving. This position forces the man to use the outer limits of his side focal viewing range.

Moreover, when most men shave, they will position their face close to a mirror in order to obtain the best possible view of the area they are shaving. Men do this so that they may see that they do not miss any portion of their face or so that they may see potential hazards that they should avoid (e.g. a mole). Unfortunately, most men that require corrective reading lens cannot position their face as close as they desire to the mirror because they are unable to properly focus on their image from such a position. Eyewear that provides a clear, magnified, wide field of view would allow this man to view his shaving as if from a close range without his image being out of focus.

Prior to the present invention, eyewear that provided a satisfactory magnified, wide field of view was not available. Conventional eyeglasses have relatively flat and relatively short lens elements. Because of these limitations, conventional eyeglasses generally do not provide a wide field of view. Also, incidentally, the action of shaving the side of the face places many men who wear conventional glasses in a position where their line of sight extends outside the temporal edge of their glasses, which leads to additional difficulties because their vision is no longer corrected. Wraparound eyeglasses provide a wider field of view then conventional eyeglasses. The optical performance of typical wraparound eyewear, however, is limited especially at the temporal edges of the lens elements. The present invention overcomes these obstacles of the prior art.

SUMMARY OF THE INVENTION

The present invention encompasses eyewear that provides a clear, magnified, wide field of view. The eyewear generally comprises dual lens elements with each lens element having a front surface, a back surface and a thickness defined therebetween. The front and back surfaces conform to a portion of the surface of a solid geometric shape, and preferably a sphere. Thus, in the preferred embodiment, each surface has a center and may be characterized by a radius. Moreover, in order to provide a wide field of view and to enable the lens element to be positioned comfortably around the cheekbone of a wearer, the front surface of the lens element is steeply curved. In the preferred embodiment, the radius of the front surface is about 43 mm.

The centers of the front and back surfaces are offset from one another so that the lens thickness tapers from a maximum thickness at a central portion of the lens element to a thinner thickness at both the nasal and temporal edges. In the preferred embodiment, the lens thickness is approximately 4 mm at the nasal edge of the lens element and approximately 2.3 mm at the temporal edge. In this embodiment, the maximum lens thickness is approximately 7 mm.

The lens elements are formed so that they have significant positive power, such as a vertex power of +4.45 diopters for the preferred embodiment. In order to achieve this positive magnification given the steeply curved aspect of the front surface, and taking into account the thickness of the lens element and the index of refraction of the lens element material, it is generally required that the back surface is less steeply curved. Thus, in the preferred embodiment, the radius of the back surface is about 60 mm.

Finally, to achieve a clear field of view, especially in the temporal field, and to provide a natural and comfortable transition between the forward looking, which uses both eyes, and the extreme side or temporal looking view, which uses only one eye, the lens elements are oriented so that the optical axes of the lens elements deviate away from the wearer's forward line of sight in a direction generally toward the wearer's temples. This orientation causes the axes to converge at a point behind the lens elements. In a preferred embodiment, the axes are angled at about 20.5 degrees from the forward-looking position and converge approximately 106 mm behind the front surface. Also, the optical nodes of the lens elements are positioned slightly wider than the distance between a typical wearer's pupils.

BRIEF DESCRIPTION OF THE SEVERAL VIEWS OF THE DRAWINGS

In the accompanying drawings, which form a part of the specification and are to be read in conjunction therewith and in which like reference numerals are employed to indicate like parts in the various views.

DETAILED DESCRIPTION OF THE INVENTION

The present invention encompasses eyewear that provides a clear, magnified, wide field of view. The eyewear has dual lens elements, with each lens element having a steeply curved front surface to provide the wide field of view. The lens elements are oriented so that the optical axes of the lens elements deviate away from the wearer's forward line of sight in a direction generally toward the wearer's temples and have optical nodes that are positioned slightly wider than the distance between a typical wearer's pupils so that the entire field of view is clear. Finally, the curvature of the back surface is formed in a manner that provides the desired magnification, which allows clearer focus at a close distance.

Figure 1:
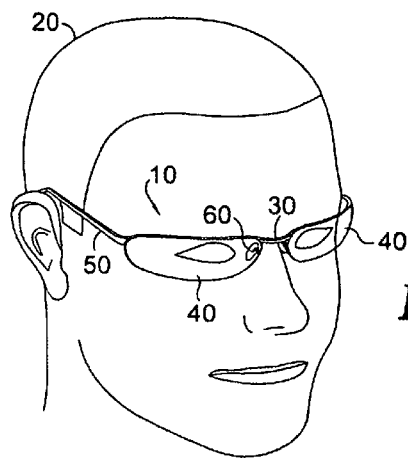
FIG. 1 is a perspective view of a person wearing a pair of eyeglasses according to one embodiment of the present invention.

Referring initially to FIG. 1, there is illustrated eyewear (generally denoted by the numeral 10) constructed in accordance with an embodiment of the present invention being worn by a person 20. Eyewear 10 generally comprises a frame 30 that surrounds, supports and orients a pair of lens elements 40. An earstem 50 is pivotally attached to each temporal edge of frame 30, and two nasal supports 60 are attached about the central portion of frame 30.

It should be understood that the present invention relates mainly to the dimensions and orientation of the lens elements. Thus, the particular mounting frame shown is not essential to the present invention and should not be construed as limiting the scope of the invention. For example, frame 30 could extend across only the top edge or only the bottom edge of each lens element 40 so long as the orientation of the lens elements is maintained about the head of person 20. Moreover, it should be understood that eyewear 10 could be frameless with earstems 50 and nasal supports 60 attached directly to lens elements 40 and including a nasal bridge between lens elements 40.

Figure 2:
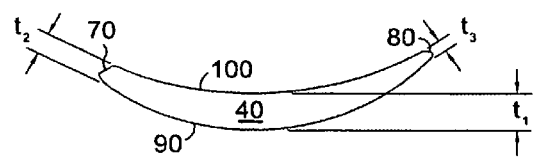
FIG. 2 is a horizontal cross sectional view of a lens element constructed according to one embodiment of the present invention with the maximum thickness, nasal edge thickness and temporal edge thickness set out.

Referring now to FIG. 2, in cross section lens elements 40 of the present invention are characterized by a generally arcuate shape. Each lens element 40 extends from a nasal edge 70 to a temporal edge 80. Additionally, each lens element 40 has a front surface 90 and a rear surface 100 with a varying thickness defined therebetween.

It should be understood that lens element 40 in FIG. 2 is shown in cross section. From FIG. 1 it should be apparent that front surface 90 and back surface 100 conform to a portion of the surface of a solid geometric shape, and preferably a sphere. Thus, in the preferred embodiment, each surface has a center and may be characterized by a radius. Additionally, as is understood by those in the field, each lens element will have an optical node 210 (see FIG. 3) that is indicative of a position from which it appears that light passing through the lens element is not refracted.

Continuing with FIG. 2, the thickness of lens element 40 tapers smoothly from a maximum thickness positioned about the central portion of lens element 40 to each edge 70 and 80. Generally, the maximum thickness ($t_1$) is positioned at or near the optical node 210 (see FIG. 3) of lens element 40. As is understood by those in the field, the thickness of lens elements 40 is affected by numerous factors. However, in embodiments of the present invention, the maximum thickness ($t_1$) is in the range of about 7–8 mm, and preferably is about 7.1 mm. The thickness at nasal edge 70 ($t_2$) is in the range of 3.75–4.25 mm, and preferably is about 4 mm. The thickness at temporal edge 80 ($t_3$) is preferably in the range of about 2–3 mm, and preferably is about 2.3 mm.

Figure 3:
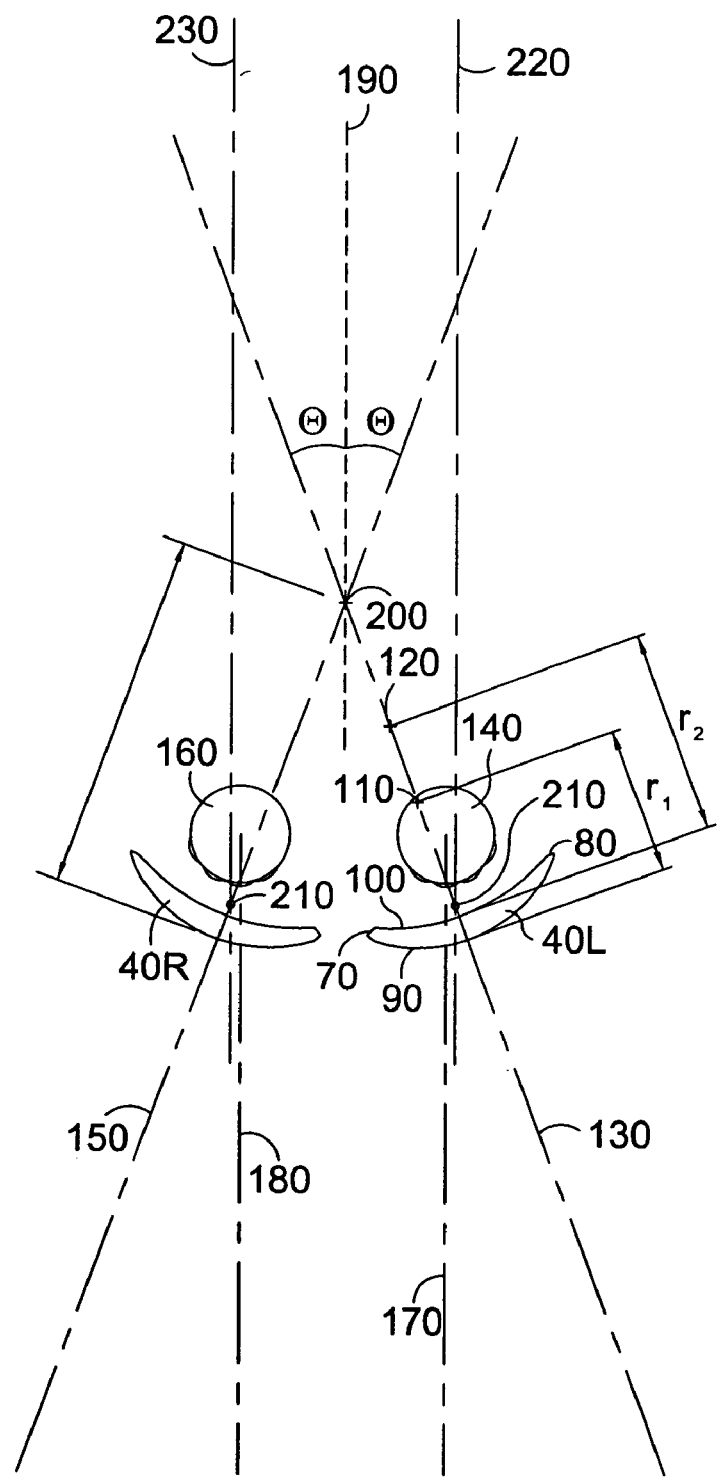
FIG. 3 is a horizontal cross sectional view of a pair of human eyes and lens elements configured according to one embodiment of the present invention with various measurement noted.

Referring now to FIG. 3, in the preferred embodiment, front surface 90 conforms to a portion of a sphere shown here in cross section. Thus, front surface 90 has a center 110 and may be characterized by radius $r_1$. As stated above, front surface 90 is steeply curved. Thus, in embodiments of the present invention, front surface radius $r_1$ is in the range of approximately 35–50 mm. In the preferred embodiment, front surface radius $r_1$ is about 43 mm.

Back surface 100 also conforms to a portion of a sphere in the preferred embodiment as shown in FIG. 3. Back surface 100 has a center 120 and may be characterized by radius $r_2$. In embodiments of the present invention, back surface radius $r_2$ is in the range of approximately 50–70 mm. In the preferred embodiment, back surface radius $r_2$ is about 60 mm.

As noted above, the thickness of lens element 40 tapers smoothly from a maximum thickness positioned about the central portion of lens element 40 to each edge 70 and 80. This taper results from center 110 of front surface 90 being offset from center 120 of back surface 100. A line, such as dashed line 130, drawn through centers 110 and 120 represents the optical line of sight for the lens element. More specifically, dashed line 130 represents the optical line of sight for lens element 40L, which is positioned in front of left eye 140, and dashed line 150 represents the optical line of sight for lens element 40R, which is positioned in front of right eye 160.

Continuing with FIG. 3, dashed lines 170 and 180 represent the normal line of sight for left eye 140 and right eye 160 respectively. As used herein, the phrase normal line of sight refers to a line projecting straight forward from the subject eye without any substantial deviation in either the horizontal or vertical planes. Dashed line 190, which lies in the same horizontal plane as lines 170 and 180, represents a composite forward line of sight. The vertical plane for line 190 lies at the midpoint between the vertical planes of lines 170 and 180.

As shown in FIG. 3, lens elements 40L and 40R are oriented so that lines 130 and 150 (i.e., the optical axes of the lens elements) diverge from the lines of sight 170 and 180 respectively in a direction generally toward the wearer's temples. This orientation causes lines 130 and 150 to converge at a point 200 behind the lens elements. In the preferred embodiment, lines 130 and 150 converge approximately 106 mm behind front surface 90. Moreover, the orientation causes the optical axes of lens elements 40L and 40R to be angled from forward line of sight 190 at an angle θ. In embodiments of the present invention, the angle θ is in the range of approximately 15–35 degrees. In the preferred embodiment, the angle θ is about 20.5 degrees.

Dashed lines 220 and 230 are drawn through optical nodes 210 and parallel in both the horizontal and vertical planes to lines 170 and 180 respectively. From the relative position of the lines it is apparent that optical nodes 210 are positioned slightly wider than the distance between a wearer's pupils, which should be understood to be the distance between lines 170 and 180. This positioning of optical nodes 210 results in higher quality peripheral viewing without significant sacrifice to the quality of forward viewing. Both the orientation of the optical axes at an angle to the forward line of sight as described above and the distance between nasal edges 70 of lens element 40L and lens element 40R affect the position of optical nodes 210. In embodiment of the present invention, nasal edges 70 of lens element 40L and lens element 40R are spaced apart by distance in the range of 10 –25 mm, while in the preferred embodiment the distance is about 18 mm, which causes the distance between line 230 and line 1880 and the distance between line 220 and line 170 to be about 0.02 mm.

Figure 4:
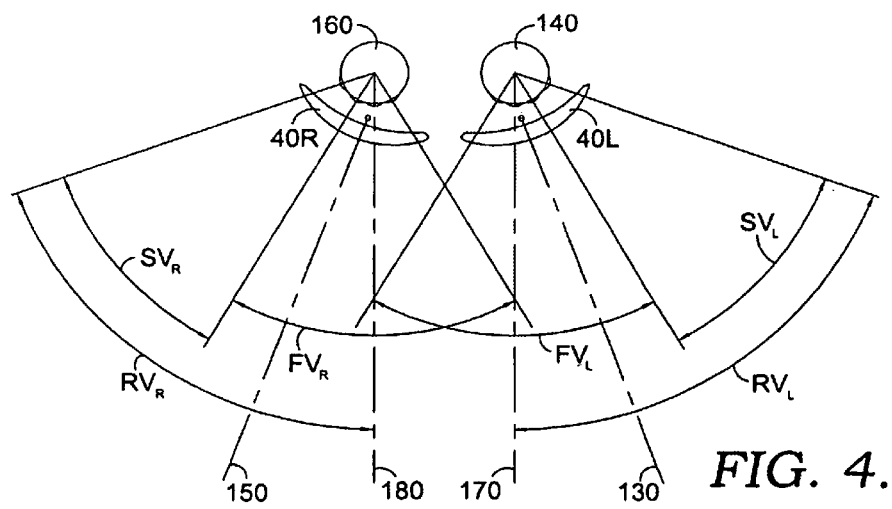
FIG. 4 is a horizontal cross sectional view of a pair of human eyes and lens elements configured according to one embodiment of the present invention with various ranges of vision noted.

The geometry described above allows the present invention to provide the wide field of view shown in FIG. 4. Stated generally, a person's field of vision may be broken into two parts. In normal forward vision, both eyes cooperate to provide an image. However, as the eyes are turned to the side, the view from one eye is ultimately occluded by the bridge of the nose so that only one eye is able to provide an image. Thus, a full field of vision includes both the area where both eyes cooperate to provide an image and the area where only one eye provides an image.

Continuing with FIG. 4, the range of normal forward vision for left eye 140 provided by the present invention is represented by $FV_L$ and the range of normal forward vision for right eye 160 is represented by $FV_R$. Similarly, the range of side vision for only left eye 140 provided by the present invention is represented by $SV_L$ and the range of side vision for right eye 160 is represented by $SV_R$. In the preferred embodiment, $FV_L$ and $FV_R$ are about 60.0 degrees and $SV_L$ and $SV_R$ are about 40.0 degrees.

A useful measurement reflective of the total range of vision provided by the present invention may be taken by measuring from forward lines of sight 170 and 180 to the extreme outer edges of the range of side vision for only one eye. This measurement is represented in FIG. 4 by $RV_L$ and $RV_R$. In the preferred embodiment $RV_L$ and $RV_R$ are about 70 degrees.

Lens elements in accordance with the present invention may be manufactured utilizing a variety of processes as is well known in the field. For example, the lens elements may be formed by grinding a blank into the desired shape or cut from a preformed injection molded blank. The lens elements may also be formed directly by injection molding techniques.

The lens elements of the present invention also may be formed from a variety of material as is well known in the field. Such materials include polycarbonate, which is used in the preferred embodiment, or other polymeric materials and other plastics. The lens elements may also be made from glass. Each type of material has its own index of refraction, which affects the geometry of the lens elements.

As is well known in the art, several factors affect the strength of a lens element, including the curvature of front and back surfaces, the thickness of the lens element and the index of refraction of the material used to form the lens element. For the present invention, the requirement of a wide field of view has an effect on the range of the surface curvatures. Additionally, at least for the preferred embodiment, the desire to have the lens elements extend comfortably around the cheekbones of a person and accommodate a wide variety of facial geometry also affects the range of the surface curvatures. Thus, for the preferred embodiment, which is formed from a polycarbonate plastic having a refractive index of about 1.6 and which has a front surface radius of about 43 mm and a back surface radius of about 60 mm, the strength of the front surface is about +12.4 diopters and strength of the back surface is about −8.9 diopters. Thus, the resulting vertex power for the preferred embodiment is about +4.45 diopters. It should be understood that other greater and lesser positive vertex powers are included in the scope of the invention.

While particular embodiments of the invention have been shown, it will be understood, that the invention is not limited thereto, since modifications may be made by those skilled in the art, particularly in light of the foregoing teachings. Reasonable variation and modification are possible within the scope of the foregoing disclosure of the invention without departing from the spirit of the invention.

The invention claimed is:

1. Eyewear for providing a clear, magnified, wide field of view comprising:
    a pair of lens elements, each of said lens elements having a spherically shaped front surface, said front surface having a front surface center and a front surface radius, and a spherically shaped back surface, said back surface having a back surface center and a back surface radius, said front surface and said back surface defining a thickness therebetween, each said lens element further having a nasal edge, a temporal edge and an optical node, each said lens element further having a positive vertex power; and
    wherein said front surface center is offset from said back surface center so that said thickness tapers from the thickest portion of said lens element in the direction of both said nasal edge and said temporal edge; and
    wherein each of said lens elements are oriented in an as worn position so that an axis drawn through said front surface center and said back surface center diverges from a person's normal line of sight toward said temporal edge by at least about 15 degrees so that said optical node is positioned outside of the person's normal line of sight and toward said temporal edge.

2. Eyewear according to claim 1 further comprising a frame, said frame supporting and orienting said pair of lens elements.

3. Eyewear according to claim 1 wherein said front surface radius is in the range of about 35–50 mm.

4. Eyewear according to claim 3 wherein said front surface radius is about 43 mm.

5. Eyewear according to claim 3 wherein said back surface radius is in the range of about 50–70 mm.

6. Eyewear according to claim 5 wherein said back surface radius is about 60 mm.

7. Eyewear according to claim 1 wherein said axis drawn through said front surface center and said back surface center is offset from said person's normal line of sight by an angle in the range of about 15–35 degrees.

8. Eyewear according to claim 7 wherein said angle is about 20.5 degrees.

9. Eyewear according to claim 1 wherein said lens element is manufactured from polycarbonate plastic.

10. Eyewear according to claim 1 wherein said vertex power is greater than +4 diopters.

11. Eyewear according to claim 10 wherein said vertex power is +4.45 diopters.

12. Eyewear according to claim 1 wherein the resulting total range of vision for each lens element is about 70 degrees to the side of straight forward looking.

13. Eyewear according to claim 1 wherein said lens elements are spaced apart by a distance in the range of about 10–25 mm.

14. Eyewear according to claim 13 wherein said distance is about 18 mm.

* * * * *